US010598554B2

(12) United States Patent
Kiesel et al.

(10) Patent No.: US 10,598,554 B2
(45) Date of Patent: Mar. 24, 2020

(54) THERMOCHROMIC SENSING FOR NANOCALORIMETRY

(71) Applicant: Palo Alto Research Center Incorporated, Palo Alto, CA (US)

(72) Inventors: Peter Kiesel, Palo Alto, CA (US); Joerg Martini, San Francisco, CA (US); Michael I. Recht, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1011 days.

(21) Appl. No.: 14/984,754

(22) Filed: Dec. 30, 2015

(65) Prior Publication Data

US 2017/0191881 A1    Jul. 6, 2017

(51) Int. Cl.
*A61B 5/00* (2006.01)
*G01K 17/00* (2006.01)
*G01K 11/12* (2006.01)

(52) U.S. Cl.
CPC ............ *G01K 17/006* (2013.01); *G01K 11/12* (2013.01)

(58) Field of Classification Search
CPC ...... G01K 11/12; G01K 17/006; G01N 21/78; G01N 31/229; B41M 5/3333; B41M 5/282; B41M 5/284; B41M 5/28
USPC ..... 600/300, 549; 356/417, 317, 326; 506/9, 506/11, 39
See application file for complete search history.

(56) References Cited

U.S. PATENT DOCUMENTS

| 3,561,269 | A | * | 2/1971 | Seitz | ............... G01K 11/12 374/162 |
| 3,813,554 | A | * | 5/1974 | Chang | ............... C09K 9/00 250/461.1 |
| 6,160,617 | A | * | 12/2000 | Yang | ............... G01J 3/2823 356/300 |
| 6,265,182 | B1 | | 7/2001 | Kocagoz | |
| 7,094,595 | B2 | * | 8/2006 | Cunningham | ........ B01L 3/5085 356/491 |
| 7,118,710 | B2 | * | 10/2006 | Cunningham | ........ B01L 3/5085 422/82.09 |
| 7,701,590 | B2 | | 4/2010 | Kiesel et al. | |

(Continued)

FOREIGN PATENT DOCUMENTS

EP    1630532    3/2006
WO   WO00/24438    5/2000
(Continued)

OTHER PUBLICATIONS

File History for U.S. Appl. No. 14/984,739.
(Continued)

*Primary Examiner* — May A Abouelela
(74) *Attorney, Agent, or Firm* — Mueting, Raasch & Gebhardt, P.A.

(57) ABSTRACT

A nanocalorimeter device includes a substrate having test cells, each test cell comprising a sample location. Each sample location includes a reaction surface suitable for an enthalpic reaction of constituents of liquid droplets, droplet movement and configured to merge the droplets, and a layer of thermochromic material thermally coupled to the reaction surface. The thermochromic material is configured to exhibit a spectral shift in light emanating from the thermochromic material in response to a change in temperature of the merged droplets.

23 Claims, 12 Drawing Sheets

(56) References Cited

U.S. PATENT DOCUMENTS

| | | | |
|---|---|---|---|
| 7,709,047 B2* | 5/2010 | Emmert-Buck | G01N 33/543 356/36 |
| 7,768,640 B2 | 8/2010 | Cunningham et al. | |
| 7,784,173 B2 | 8/2010 | Wolkin et al. | |
| 7,833,800 B2 | 11/2010 | Bell et al. | |
| 8,594,470 B2 | 11/2013 | Kiesel et al. | |
| 8,617,899 B2 | 12/2013 | De Bruyker et al. | |
| 8,685,216 B2 | 4/2014 | De Bruyker et al. | |
| 2001/0026915 A1* | 10/2001 | Charych | A61K 9/1273 435/7.1 |
| 2002/0047003 A1 | 4/2002 | Bedingham et al. | |
| 2003/0052305 A1* | 3/2003 | Coates | A61K 8/0295 252/299.64 |
| 2007/0009968 A1* | 1/2007 | Cunningham | B82Y 20/00 435/7.9 |
| 2007/0259598 A1* | 11/2007 | Ribi | B32B 37/14 446/385 |
| 2008/0278722 A1* | 11/2008 | Cunningham | G01N 21/6428 356/317 |
| 2009/0214804 A1* | 8/2009 | Levine | F41H 3/00 428/29 |
| 2009/0255535 A1* | 10/2009 | Kanzer | A62B 18/025 128/206.14 |
| 2009/0318306 A1 | 12/2009 | Hasson et al. | |
| 2010/0159610 A1* | 6/2010 | Sun | G01N 21/78 436/147 |
| 2010/0268112 A1* | 10/2010 | Short | G01K 11/14 600/549 |
| 2012/0312822 A1* | 12/2012 | Cheng | A47J 45/068 220/573.1 |
| 2013/0157376 A1 | 6/2013 | Nay | |
| 2013/0225441 A1* | 8/2013 | Hassibi | C40B 30/04 506/9 |
| 2013/0266977 A1 | 10/2013 | Mitchell et al. | |
| 2014/0273191 A1 | 9/2014 | Tipgunlakant et al. | |
| 2014/0288381 A1* | 9/2014 | Faarbaek | A61B 5/0002 600/300 |
| 2016/0156213 A1* | 6/2016 | Yajima | F28D 20/028 320/152 |
| 2017/0191020 A1 | 7/2017 | Recht et al. | |
| 2017/0191107 A1 | 7/2017 | Martini et al. | |

FOREIGN PATENT DOCUMENTS

| | | |
|---|---|---|
| WO | WO2008/041146 | 4/2008 |
| WO | WO2012/094426 | 7/2012 |

OTHER PUBLICATIONS

Search Report from EP App. No. 16204547.0 dated Apr. 7, 2017, 8 pages.

Dybko et al., "Thermochromic compounds as transducers for fibre optic temperature probes", Opt. Eng. 42(3), 656-661, Mar. 1, 2003.

File History for U.S. Appl. No. 14/984,719.

* cited by examiner

THERMOCHROMIC SENSING FOR NANOCALORIMETRY

TECHNICAL FIELD

This disclosure relates generally to nanocalorimetry devices and to related systems and methods.

BACKGROUND calorimetry is used to measure enthalpic changes, including enthalpic changes arising from reactions, phase changes, changes in molecular conformation, temperature variations, and other variations of interest that may occur for a particular specimen. By measuring enthalpic changes over a series of conditions, other thermodynamic variables may be deduced. For example, measurements of enthalpy as a function of temperature reveal the heat capacity of a specimen, and titrations of reacting components can be used to deduce the binding constant and effective stoichiometry for a reaction. Calorimetry measurements are useful in a broad variety of applications, including, for example, pharmaceuticals (drug discovery, decomposition reactions, crystallization measurements), biology (cell metabolism, drug inter actions, fermentation, photosynthesis), catalysts (biological, organic, or inorganic), electrochemical reactions (such as in batteries or fuel cells), and polymer synthesis and characterization, to name a few. In general, calorimetry measurements can be useful in the discovery and development of new chemicals and materials of many types, as well as in the monitoring of chemical processes.

BRIEF SUMMARY

Some embodiments are directed to a nanocalorimeter device that includes a substrate having test cells, each test cell comprising a sample location. The sample location includes a reaction surface suitable for an enthalpic reaction of constituents of liquid droplets. One or more droplet movement features are disposed are configured to merge the droplets. A layer of thermochromic material is arranged so that it is thermally coupled to the liquid droplets. Light emanating from the thermochromic material exhibits a spectral shift in response to a change in temperature of the liquid droplets.

Some embodiments involve a system that includes a nanocalorimeter device as described above and one or more sensors. Each sensor senses the light emanating from the thermochromic layer at one or more of the sample locations and generates an electrical signal in response to the sensed light. The electrical signal includes information about the spectral shift.

In accordance with some embodiments, a method of using a nanocalorimeter device involves depositing a first liquid droplet and a second liquid droplet on a surface at a sample location with a spacing between the first liquid droplet and the second liquid droplet. The first and second droplets are thermally equilibrated and merged. A spectral shift in light emanating from thermochromic material thermally coupled to the merged droplets in response to an enthalpic reaction of the merged droplets is detected.

A method of making a nanocalorimeter device includes forming one or more droplet movement layers between a reaction surface and a substrate, the droplet movement layers configured to merge droplets deposited thereon and forming a thermochromic layer arranged to be thermally coupled to the merged droplets. The thermochromic layer comprises a thermochromic material configured to exhibit a spectral shift in light emanating from the thermochromic material in response to a change in temperature of the thermochromic material due to an enthalpic reaction of the merged droplets.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments discussed herein encompass nanocalorimeter devices, systems, and methods that use thermochromic sensing to detect changes in temperature. The thermochromic nanocalorimeter devices disclosed herein enable measurement of enthalpic changes (e.g., exothermic or endothermic changes), arising from chemical reactions, phase changes, changes in molecular conformation, and the like. For the purposes herein, a nanocalorimeter refers to a device capable of measuring enthalpic changes in the range of nanocalories.

Figure 1:
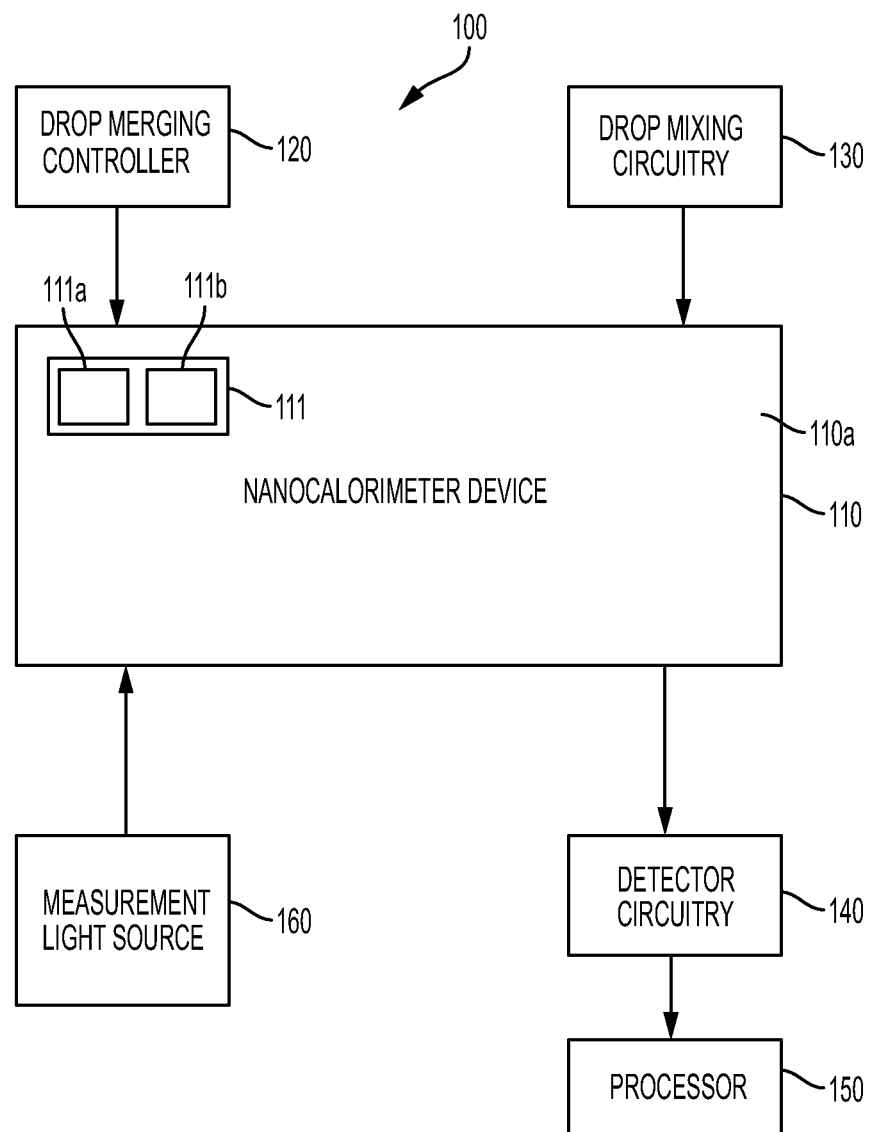
FIG. 1 is a block diagram of a nanocalorimeter system that includes thermochromic temperature sensing in accordance with embodiments described herein.

FIG. 1 is a block diagram of a nanocalorimeter system 100 in accordance with some embodiments. The system 100 includes a nanocalorimeter device 110 comprising a surface 110a that includes multiple test areas 111, referred to herein as "cells." Each cell 111 comprises a sample location 111a and optionally includes a reference location 111b. Liquid droplets are deposited on a surface 110a of the nanocalorimeter device 110 at the sample and reference locations 111a,b. The liquid droplets deposited at the sample locations 111a are test droplets having constituents that, when mixed, interact enthalpically. The reference liquid droplets deposited at the reference locations 111b are similar in composition and volume to the test droplets but do not include the interacting constituents. The liquid droplets are merged leading to an enthalpic reaction between constituents of the droplets at the sample locations. The droplets may be allowed to passively mix or may be actively mixed as discussed in more detail herein. Changes in temperature occur at the sample locations due to the enthalpic reaction of the test droplet constituents.

Thermochromic material is disposed at the sample 111a and reference locations 111b. The thermochromic material is configured to emanate light that exhibits a spectral shift as a function of temperature. The temperature changes due to the enthalpic reaction at the sample location are measured by detecting a spectral shift in light emanating from thermochromic material disposed at the sample location. In some embodiments, the spectral shift of light emanating from thermochromic material at the sample location of a cell is compared to the spectral shift of light emanating from thermochromic material at the reference location of the cell to allow for correction of common mode temperature changes, for instance temperature changes in the environment.

In some embodiments, the thermochromic material may be disposed as a layer of the nanocalorimeter device. In some embodiments, the thermochromic material may be disposed within the test and reference droplets themselves.

The light emanating from the thermochromic material at the cells 111 of the nanocalorimeter device 110 may comprise measurement light that is reflected, scattered, and/or transmitted by the thermochromic material. In some embodiments, the emanating light may be light that fluoresces from the thermochromic material in response to measurement light. The nanocalorimeter system 100 optionally includes a measurement light source 160 configured to provide measurement light to the thermochromic material. In some embodiments, the nanocalorimeter system may not include a dedicated measurement light source. In these embodiments, the measurement light may be sunlight and/or other ambient light.

The nanocalorimeter device 110 optionally includes drop merging features which are controlled by signals from a drop merging controller 120. Each sample and reference location includes a set of drop merging features. In some embodiments, one droplet is placed on each of two drop merging features after which the drop merging controller 120 activates the drop merging features causing the droplets to merge. The droplets passively mix or may be actively mixed at the reaction surfaces of the sample and/or reference locations 111a,b after the droplets are merged. Active mixing of the droplets after merging can enhance the predictability of measurement results. To facilitate droplet mixing, the sample and/or reference locations 111a,b of the nanocalorimeter system 100 may include droplet mixing features that are controlled by a drop mixing controller 130 to cause mixing of the droplets.

Detection circuitry 140 is positioned to sense the light emanating from the thermochromic material at the sample and reference locations and to generate an electrical signal responsive to the emanating light. The electrical signal includes information about the spectral shift of the light emanating from the thermochromic material at the sample locations. The spectral shift of the emanating light from a sample location indicates the temperature change associated with the enthalpic reaction that occurs at the sample location. The spectral shift of light emanating from each sample location of a cell may be compared to the spectral shift of light emanating from the reference location of that cell to correct for any common mode temperatures changes. The detection circuitry 140 may be coupled to a processor 150 configured to extract the spectral shift information from the detector signal, and/or to further process, analyze, display, store and/or perform other operations on the detector signal and/or the spectral shift information.

Figure 2:
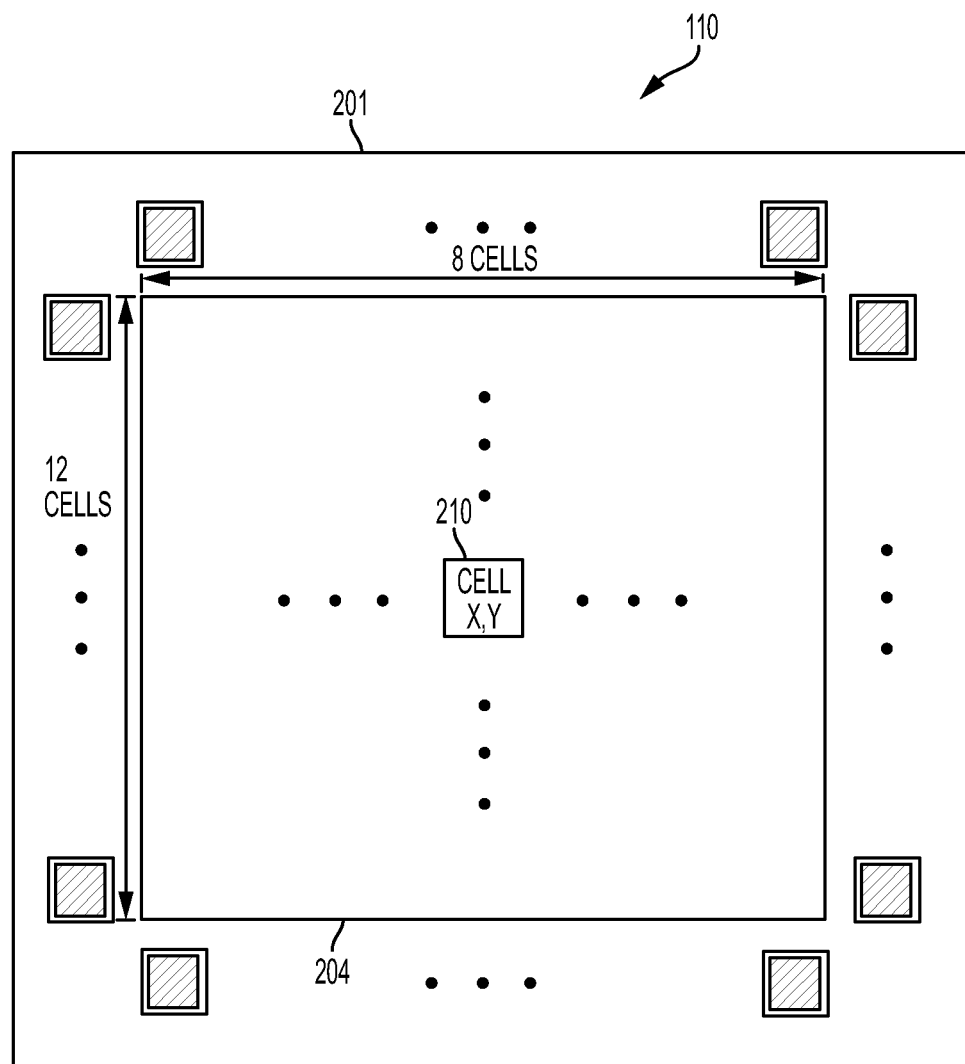
FIG. 2 shows a portion of the nanocalorimeter device of FIG. 1 in more detail.

FIG. 2 shows a portion of the nanocalorimeter device 110 in more detail. The device 110 includes a nanocalorimeter array 204 comprising an array of thermochromic sensing cells 210 integrated on a substrate 201. As shown, array 204 is eight cells wide by twelve cells long. To interface with standard automated laboratory equipment, the cells can be positioned on 9 mm centers. Other array configurations are possible, including different numbers of cells than those shown in FIG. 2 arranged in different configurations and/or at different pitches. Array 204 can be one of several arrays fabricated on a single substrate 201, which can be a polymer layer or a silicon nitride layer, for example. Substrate 201 may include any of a variety of polymers with or without additional non-polymer layers. Suitable polymer materials for use as a substrate include polyimide (for example, DuPont Kapton® and others), polyester (for example, DuPont Mylar®), DuPont Teonex® PEN, or DuPont Teijin® Tetoron® PET) foil, PolyEtherEtherKetone (PEEK), or PolyPhenylene Sulphide (PPS).

Within array 204, illustrative cell 210 may be implemented in any of a variety of ways, and all cells 210 within array 204 could be substantially the same, although, alternatively, at least some of the cells may be differently constructed than other cells of the array.

Figure 3A:
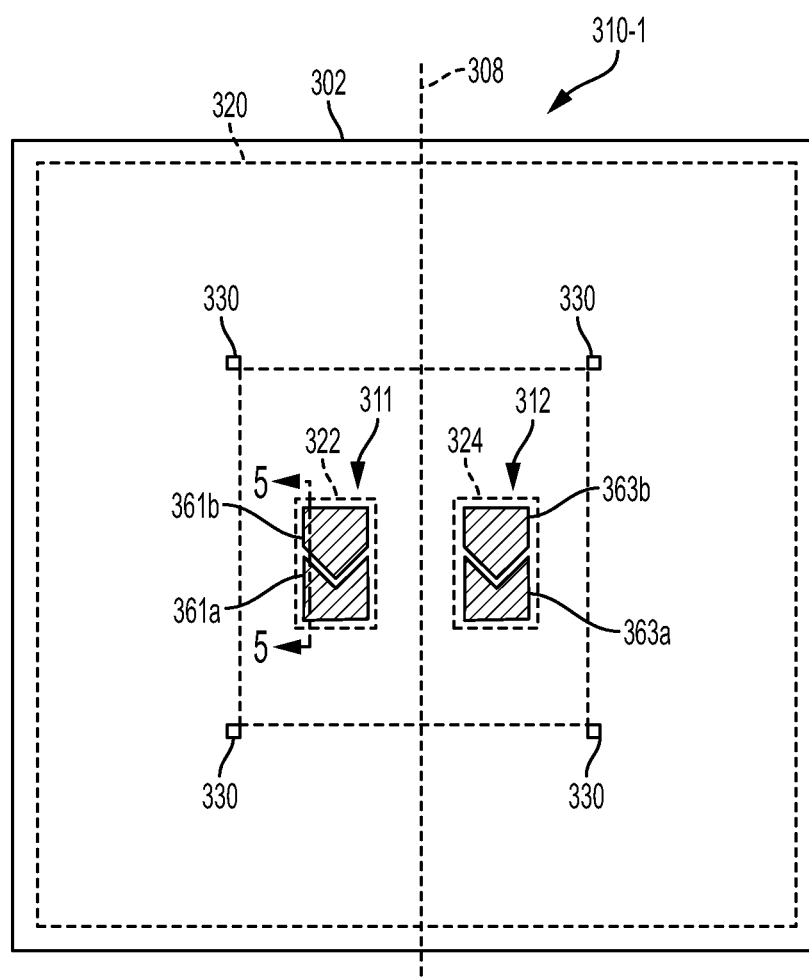
FIG. 3A illustrates a thermochromic sensing cell that uses optical drop merging in accordance with some embodiments.
Figure 3B:
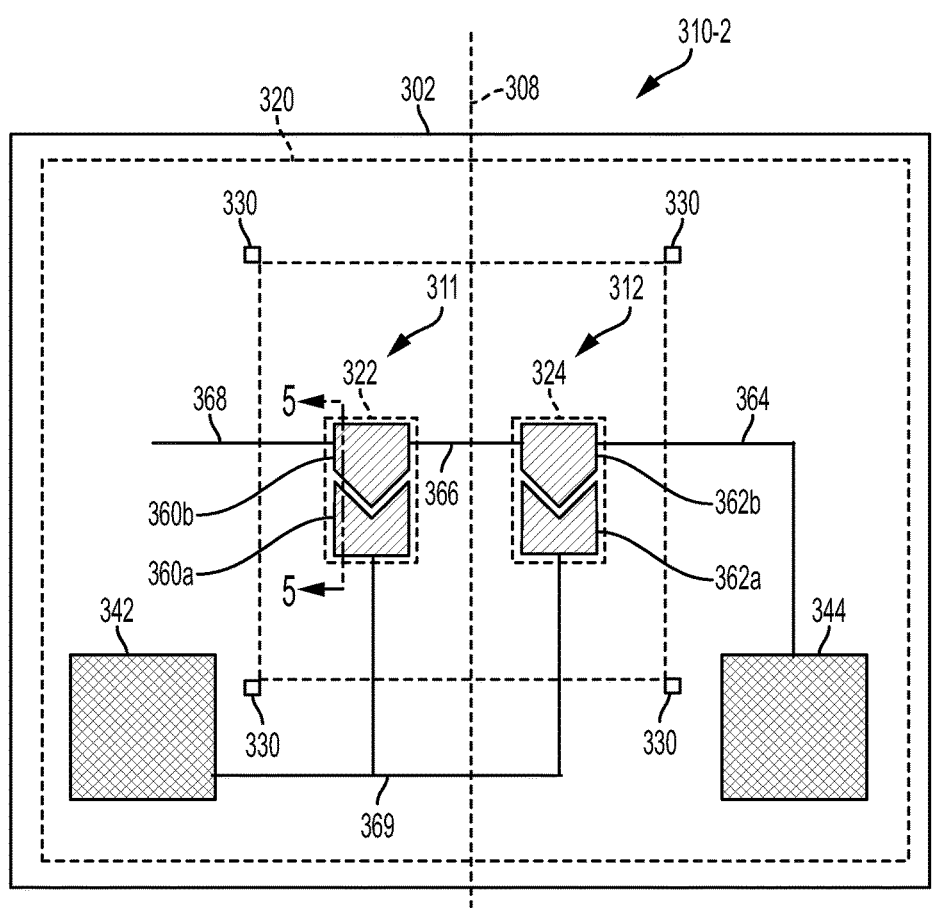
FIG. 3B illustrates a thermochromic sensing cell that uses electrostatic drop merging in accordance with some embodiments.

FIGS. 3A and 3B illustrate thermochromic sensing cells 310-1, 310-2 that could be used as the thermochromic sensing cell 210 of FIG. 2. The thermochromic sensing cells 310-1, 310-2 of FIGS. 3A and 3B are similar in many respects, however, FIG. 3A illustrates a thermochromic sensing cell 310-1 that uses optical drop merging features 361a, b, 363a, b and FIG. 3B illustrates a thermochromic sensing cell 310-2 that includes an electrical drop merging features 360a,b, 362a,b. The drop merger features 360a,b-363a,b comprise features disposed on or underneath the reaction surface and configured to merge the droplets. For optically induced merging and/or mixing, the droplet movement features 361a,b, 363a,b may be a thin coating on top of the reaction providing a surface property to the reaction surface itself which gets optically changed and triggers the droplet movement. For electrostatically induced merging and/or mixing, the droplet movement features 360a,b, 362a,b may comprise electrodes that are energized to trigger the droplet movement.

Each thermochromic sensing cell 310-1, 310-2 includes a sample sensing location 311 and optionally includes an identical adjacent reference sensing location 312, The sample and reference sensing locations 311, 312 can provide a differential temperature measurement based on thermochromic sensing. Each sample and reference location 311, 312 may have its own isothermal droplet merging and/or mixing mechanism. In various embodiments, droplet merging may be may be implemented electrostatically or optically as discussed in more detail herein. Droplet mixing may be passive or may be actively driven, e.g., magnetically, optically, or mechanically, e.g., by vibrations such as surface acoustic waves (SAW).

In FIGS. 3A and 3B, frame 320 (shown in dashed lines) supports polymer support layer 302 from underneath. Frame 320 can also provide a thermally stable support for the multi-layered structure that includes support layer 302. Frame 320 can have a high thermal inertia. The support layer 302 provides support for one or more thermochromic sensing cells 310-1, 310-2 wherein each thermochromic sensing cell 310-1, 310-2 includes a sample location 311 and a reference location 312. Each sample and reference location 311, 312 includes a reaction surface located on or over the support layer 302. The reaction surface for each sample location 311 is a surface upon which the droplets are merged and/or mixed and is a surface suitable for the droplet constituents to react or interact after the test droplets are merged and mixed. The reaction surface for each reference location 312 is a surface upon which the reference droplets are merged and/or mixed and is a surface suitable to support reference droplets similar in composition, volume and/or other characteristics to the test droplets but lacking the reacting or interacting constituents. The merged droplets at the sample and reference locations are thermally coupled to thermochromic material. In some embodiments, a surface of a thermochromic layer or thin coating/functionalized surface layer on the thermochromic layer provides the reaction surface.

In some embodiments, optional thermally conductive components 322 and 324 (shown in dashed lines) may be disposed on the underside of the support layer 302 at the sample and/or reference locations 311, 312. Each thermally conductive component 322, 324 is positioned so that it is exposed to the temperature of either a sample location 311 or a reference location 312 of the thermochromic sensing cell 210. These and other components of cell 310-1, 310-2 may be generally symmetrical about axis of symmetry 308, with the left and right sides of the cell 310-1, 310-2 being nearly mirror images of each other. Axis 308 is approximately straight and extends across support layer 302.

In some embodiments, frame 320 optionally has alignment structures 330 at the corners of a recess within which thermally conductive components 322 and 324 are positioned. Frame 320 can, for example, be formed from 1 mm thick stainless steel in which alignment structures 330 and the recess for thermally conductive components 322 and 324 are etched, and the recess can then provide thermal isolation between thermally conductive components 322, 324 as well as between either of the thermally conductive components 322, 324 and frame 320. Thermal isolation of the thermally conductive components 322, 324 of the thermochromic sensing cell 310-1, 310-2 could alternatively be maintained in various other ways.

Thermally conductive component 322 and/or thermally conductive component 324 can include a thermally conductive material such as copper or aluminum at a thickness of about 9 μm or thinner. In general, components 322, 324 can include any thermally conductive material and desired thermal conduction can be obtained by adjusting thickness in proportion to the material's thermal conductivity. In some embodiments, components 322, 324 may be opaque to measurement light and/or light emanating from thermochromic material. Alternatively, in some embodiments, components 322, 324 may transmit measurement light and/or light emanating from the thermochromic material as discussed in more detail herein.

Optionally, the sample and reference cells employ an optical drop merger, as illustrated in FIG. 3A or an electrical drop merger, illustrated in FIG. 3B.

FIG. 3A illustrates optical drop movement features 361a, b, 363a,b. By providing light with certain wavelengths, optically induced change in the surface properties (e.g., surface reconstruction) can be induced which results in a change in surface wetting behavior at the drop merging features 361a,b, 363a,b. The optically induced changes of the surface properties from hydrophilic to hydrophobic at the drop merging features 361a,b, 363a,b will cause the two droplets to flow into each other and merge. This approach has the advantage that the merging surfaces 361a,b and 363a,b are optically altered by light emitted from a light source and do not have to be electrically conducting. Furthermore, for optical drop merging, electrical connections to the merging surfaces are not needed. In embodiments that employ electrostatic drop merging, electrical connections to the drop merger features are typically also thermally conductive and may act as a leak for the thermal reaction energy to be measured. In some embodiments, the surface tension of the droplets themselves can be changed by incident light, causing the droplets to merge.

Where electrostatic drop merging is used, as illustrated in FIG. 3B, contact pads 342 and 344 may be disposed on a surface of the support layer 302, e.g., over frame 320. Conductive lead 364 extends from pad 344 to drop merger electrode 362b, conductive lead 366 extends between drop merger electrode 362b and drop merger electrode 360b, and conductive lead 368 extends leftward from drop merger electrode 360b to provide some symmetry with conductive line 364. Pad 342 is electrically connected to drop merger electrodes 360a, 362a by conductive lead 369. Contact pad 342 is electrically coupled by lead 369 to a drop merger electrode 360a of the sample location 311 and drop merger electrode 362a of the reference location 312. Contact pad 344 is electrically coupled by lead 364 to drop merger electrode 360b of the sample location 311 and to drop merger electrode 362b of the reference location 312. If cell 310-2 is approximately square with 9 mm sides, the contact pads 342, 344 can be approximately 1 mm×1 mm, allowing electrical connection between the contact pads 342, 344 and the drop merger controller (not shown in FIG. 3B) with pogo pins. The leads 364, 366, 368, 369 can be approximately 50 μm wide or narrower; the leads could be even wider than 50 μm as long as they do not result in loss of thermal isolation.

In some embodiments, on the opposite side of layer 302 from drop merger electrodes 360a,b-363a,b is thermally conductive component 322. When a reaction occurs within a fluid drop under control of sample drop merger electrodes 360a,b, 361a,b thermally conductive component 322 thermally couples the drop to a thermochromic layer (not shown in FIGS. 3A-3B), providing a thermally conductive path from the drop to the thermochromic layer. Similarly, thermally conductive component 324 thermally couples a fluid drop under control of reference drop merger electrodes 362, a,b, 363a,b to the thermochromic layer.

Drop merger electrodes 360a,b-363a,b shown in FIGS. 3A and 3B illustratively have chevron-shaped features, but may be shaped differently in some embodiments. A first droplet is placed asymmetrically across a gap between two drop merger electrodes, and a second droplet is placed in close proximity to the first droplet, but on the opposite side of the gap between the drop merger electrodes. For example, for 1 mm diameter droplets and a 50 μm electrode gap, the spacing between the droplets may range from approximately 50 μm to approximately 100 μm. In electrostatic drop merging, when a voltage pulse is applied to the pair of electrodes underneath the droplets, e.g. 180V for 10-50 msec, the first drop moves towards a centering position due to electrostatic force, touching and merging/mixing with the second droplet to form a merged drop.

For electrostatic drop merging, the voltage required across the drop merger electrodes may range from a low of approximately 25V to approximately 100V when the droplets are spaced approximate y 50 μm apart. With wider drop spacing, for example 250 μm or greater, a voltage exceeding 100V may be required. A nanocalorimeter device having sample and reference locations as described herein may be configured in different parameter sizes and therefore the foregoing are provided only as examples. In some embodiments, a practical range of drop size for nanocalorimetry is in the hundreds of nanoliters, e.g., 250 nanoliters, to the microliter range e.g., 1-50 microliters.

Upon merging, the constituents of the two drops mix passively primarily through diffusion if there is no active mixing. There is an enhancing effect to the passive diffusion due to the momentum the moving droplet possesses just prior to merging (The moving drop can be thought to be 'injected' into the stationary one. In some systems both drops may be made to move). Additional techniques useful for drop merging are described in commonly owned U.S. Pat. No. 8,685,216 which is incorporated by reference herein in its entirety.

The thermochromic sensing material present at the measurement and/or test locations 311, 312 may be made from any suitable type of thermochromic material such as thermochromic liquid crystals, leuco dyes, fluorophores, Prodan bound to DPPC, and/or a fluorescent proteins. In thermochromic liquid crystals, the spectral changes result from temperature-dependent intermolecular spacing. For example, monitoring a specific selected reflectance from a thermochromic liquid crystal surface has shown up to a 13,000% change in intensity per K in a ratiometric color measurement or a wavelength shift of hundreds of nm/K up to about 1000 nm/K. 6-propionyl-2-(dimethylamino)naphthalene (Prodan) bound to ipalmitoylphosphatidylcholine (DPPC) shows a fluorescent emission shift of 6 nm/K between 40° C. and 50° C. Green fluorescence protein, which shows a shift in emission wavelength by about 0.3 nm/K, is an example of a thermochromic material that could be utilized.

Changes in fluorescence intensity of some thermochromic materials suitable for thermochromic sensing cells can be particularly sensitive to temperature (over 100% per degree in some cases). As a non-limiting example, a thermochromic liquid crystal having a wavelength shift of about 1000 nm/K exhibits a wavelength shift of about 10 picometer (pm) when subjected to a temperature change of about 10 μK. In some embodiments, the thermochromic material may be configured to exhibit a spectral shift in the fluorescence, reflectance, or scattering spectrum with temperature in a range of about 0.5 nm/K to about 1000 nm/K.

The spectral shift can occur in any kind of emission, absorption, fluorescence, reflection, or transmission, or any other light spectrum emanating from the thermochromic material. A spectral shift (also referred to as a "wavelength shift") in a light spectrum can be described as the difference between centroids of two light spectra. The wavelength shift may be determined by determining a measured centroid position with an implicit centroid position, determined in, for example, a calibration measurement or a nominal centroid position. The wavelength shift may be determined by comparing two different centroids of two different spectra effectively simultaneously to perform a referenced wavelength shift measurement. Light spectra, or light intensity spectra may be measured in various measurement units. Commonly, the varying parameter of the spectrum (i.e. Abscissa) is the photon energy, often measured in wavelength. In such a measurement the wavelength shift (spectral shift of the centroid position) can be measured in wavelength units, for example nanometers (nm). For certain emission spectra, in particular emission peaks or Gaussian emission profiles, the peak wavelength is a good approximation of the centroid position or the difference of peak positions relative to one another is a good approximation of wavelength shift. In practical measurements the centroid determination may be influenced by measurement parameters that may vary over the wavelength shift detection range so that there are additional measurement factors that are contributing to centroid measurements, for example wavelength dependent sensitivity of detectors. These measurement influences can be considered as systematic errors of the measurements and are often compensated for by calibration. Any such error, even if it is not compensated for, should be considered as part of the centroid, wavelength or wavelength shift measurement. It is noteworthy that emission spectra may consist of, for example, two relatively discrete emission distributions with two emission maxima. The centroid of these combined emission spectra can still be calculated and measured, a wavelength shift can still be calculated for such a spectrum. In particular, if two fluorescence emission spectra are used in such a way that one of the emission spectra changes the emission intensity with temperature then temperature changes result in a wavelength shift of the overall spectrum.

After the merging of two small (e.g., approximately 250 nl) droplets, the device measures the spectral shift of the thermochromic material which indicates a temperature change in the sample location relative to a simultaneous merging of similar but non-reacting materials in the reference location. (Referring to FIGS. 3A and 3B, note that the sample and reference location may be identical, thus one could also choose 312 as the sample location and 311 as the reference location.) The spectral shift of the thermochromic material at the sample location relative to the spectral shift of thermochromic material at the reference location effectively subtracts out correlated common mode background drifts in temperature.

The cross section illustrations shown in FIGS. 4-7 taken along line 5-5 in FIG. 3B illustrate the measurement locations 311a-311d of test cells 310-2a-310-2d according to various embodiments. It will be appreciated that, although the drop merging technique used in test cells 310-2a-310-2d is electrostatic, the thermochromic material, measurement light source and/or detectors shown in FIGS. 4-7 could be similarly employed in a test cell that uses optical drop merging.

Figure 4:
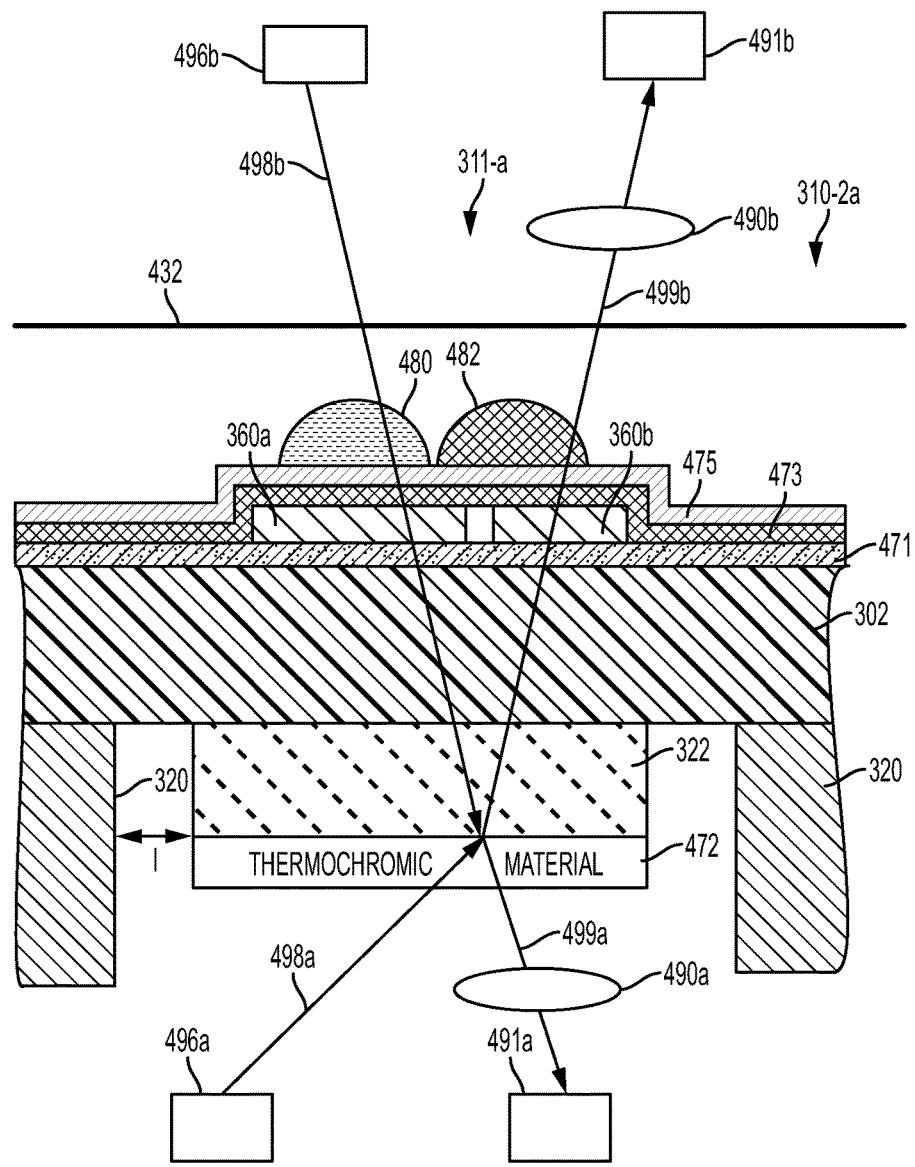
FIGS. 4-7 are cross sections that show measurement locations of thermochromic sensing test cells according to various embodiments.

The cross section shown in FIG. 4, taken along the line 5-5 in FIG. 3B, illustrates features of the sample location 311-a of thermochromic sensing cell 310-2a in accordance with some embodiments. FIG. 4 illustrates a portion of the frame 320 that supports the support layer 302. In the embodiment shown in FIG. 4, the optional thermally conductive component 322 is disposed below the support layer 302, between the support layer 302 and the thermochromic material 472. A barrier layer 471 is disposed deposited on the upper side of support layer 302, protecting the layers above against contaminants and humidity and therefore increasing device performance. In some implementations, barrier layer 471 is a layer of approximately 300 nm of silicon oxynitride (SiOxNy).

Various other layers, e.g., thermochromic layers, conductive lines, electrodes, and additional layers to provide electrical passivation, environmental barriers, hydrophobic or oleophobic surfaces, or other properties can be disposed on surfaces of the support layer 302, above the support layer 302 and/or below the support layer 302. Techniques for producing various elements of a test cell 310-2a as shown in FIG. 4 are described in commonly owned U.S. Pat. No. 7,784,173 which is incorporated herein by reference in its entirety. An anti-evaporation layer, e.g., cap layer 432, reduces evaporation of the droplets 480, 482 after deposition. The cap layer 432 includes at least one cavity that is positioned above and in contact with an upper surface of the nanocalorimeter device such that the cap 432 forms a seal around each pair of measurement and reference locations. In some scenarios, the cap layer 432 is applied after deposition of the droplets 480, 482. Alternatively, in some scenarios, the droplets 480, 482 are deposited through the cap layer 432. In some scenarios, the cap layer 432 may transmit measurement light and/or light emanating from the thermochromic material.

FIG. 4 illustrates a sample location of test cell 310-2a that includes drop merger electrodes 360a, 360b positioned over the surface of support layer 302. As shown in FIG. 4, in some embodiments, the drop merger electrodes 360a, 360b are disposed on the surface of barrier layer 471 and are covered by an electrically insulating layer 473. Drop merger electrodes 360a, 360b are made of an electrically conductive material and may be approximately 1.0 mm by 0.8 mm in size, with a thickness ranging in size from approximately 0.1 µm to approximately 10 µm. The electrodes 360a, 360b may be separated by a gap of approximately 50 µm. Suitable materials for drop merger electrodes include a thin film of aluminum, copper, chromium, titanium-tungsten (TiW), or a combination thereof. In some implementations, as discussed below, the drop merger electrodes 360a, 360b may transmit measurement light and/or light emanating from the thermochromic material. Suitable materials for transparent drop merger electrodes include indium tin oxide (ITO), highly doped zinc oxide, and/or other transparent conductive oxides and/or conductive polymers, for example. In alternative embodiments, the drop merger electrodes 360a, 360b may be opaque to measurement light and/or to the light emanating from the thermochromic material.

The insulating layer 473 shown in FIG. 4 may be approximately 0.1 µm to approximately 2 µm in thickness. Suitable materials for the insulating layer 473 include silicon oxide or silicon nitride or silicon oxynitride, or spin-, spray-, or otherwise deposited polymers, such as parylene, Dupont Teflon® AF, 3M™ Fluorad™ products, 3M™ EGC 1700, other fluoropolymers, polysiloxanes, diamond-like carbon or other spin-coated, spray-coated, dip coated, or vapor deposited polymers. Suitable insulator materials have a high electrical resistivity, chemical and mechanical durability, have no pinholes in deposited thin film form. In some embodiments, the insulating layer 473 is made of a material that transmits measurement and/or emanating light from the thermochromic material. In alternative embodiments, the insulating layer is opaque to the measurement and/or emanating light.

The drop merger electrodes 360a, 360b receive drop merger electrical signals from a drop merger controller that controls electrostatic drop merging. For example, drop merger signals could include high voltage pulses received with opposite polarity on different electrodes, such as through conductive leads as described above with reference to FIG. 3B.

In FIG. 4, a first droplet 480 has been deposited on the upper surface of drop merger electrodes 460a, 460b. A second droplet 482 can be deposited on the upper surface but positioned asymmetrically over a gap between electrodes 360a, 360b with a proportion of drop 482 directly above electrode 360b larger than the proportion above electrode 360a. First droplet 480, on the other hand, can be deposited entirely above electrode 360a. Depositing droplets as described above is but one example of an operation that "positions" samples, such as by positioning samples within a region; more generally, an operation "positions" a sample in a region if the operation begins with the sample not in the region and ends with the sample in the region.

As shown in FIG. 4, in some embodiments, a hydrophobic surface of layer 475 minimizes the adhesion of drops 480 and 482 to the surface, which reduces the drag on the drops during merging. The hydrophobic surface may be made of a fluorinated polymer, such as, for example, 3M™ Fluorad™, Dupont Teflon® AF, 3M™ EGC-1700, or plasma-deposited fluorocarbons. In some implementations, a parylene coating may be used as the insulator layer 473, as well as for the hydrophobic surface.

Figure 5:
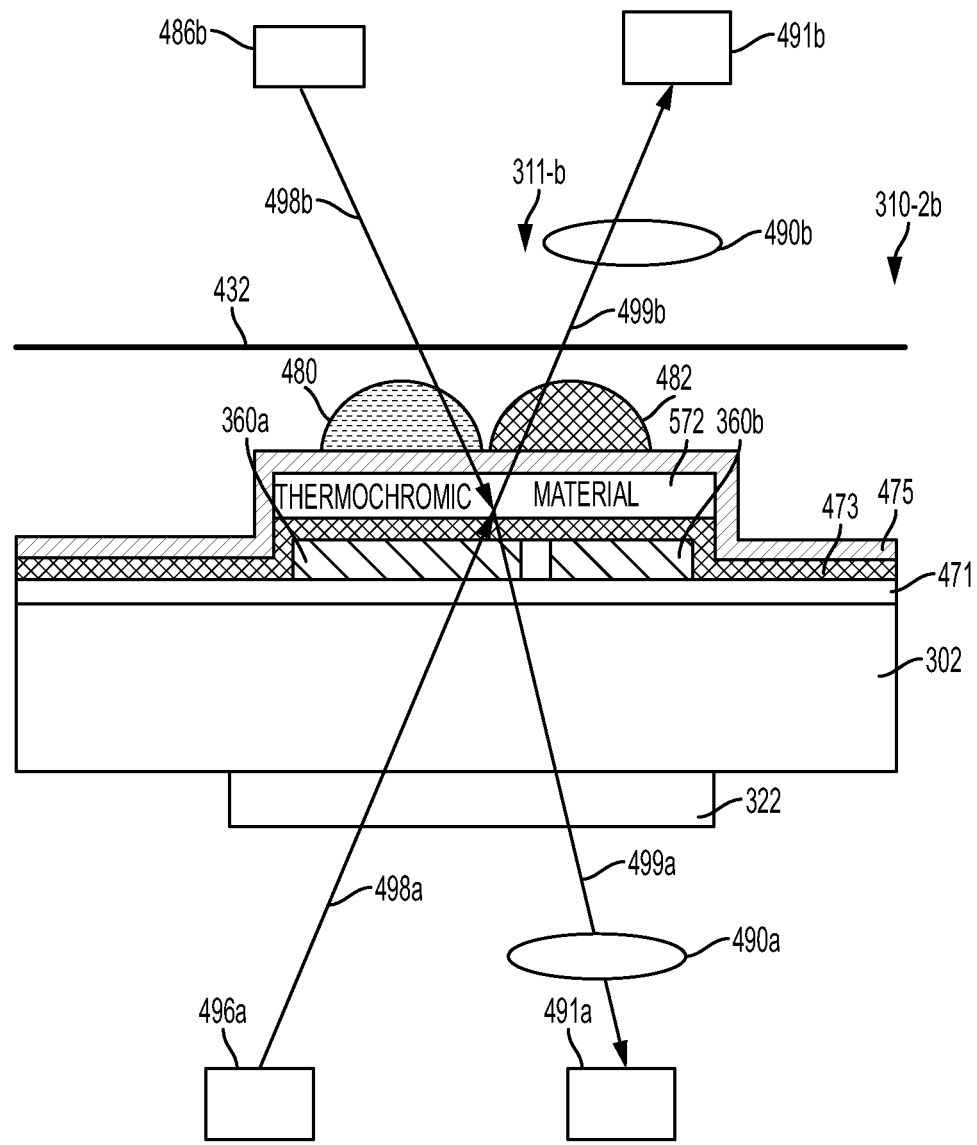

After drops 480 and 482 have been deposited, there may be a period of time wherein drops 480, 482 remain separated until the drops 480, 482 reach thermal equilibrium. After the period of time in which the droplets 480, 482 are thermally equilibrated, the drop merger controller (not shown) can provide a high voltage pulse across the two electrodes 360a, 360b, causing drop 482 to be electrostatically propelled leftward toward stationary drop 480, and therefore causing the two drops to merge. Various other signals could be provided to various combinations of electrodes to cause drops to merge, including those described in U.S. Pat. No. 8,685,216 which is incorporated herein by reference in its entirety. Although FIGS. 4 and 5 illustrate the use of electrical drop merging, it will be appreciated that the technique of optical drop merging as described above may alternatively be used.

The merged drops may mix by diffusion, and the high voltage pulse can also be sufficiently strong that the two drops mix more quickly after they have merged when compared to mixing by diffusion. The mixing of the droplets initiates a reaction between constituents in drop 480 and constituents in drop 482. The mixing of the drops 480, 482 can be enhanced by stirring of the merged drop by optical and/or magnetic actuation methods. In some embodiments, magnetic mixing materials are located within the droplets. The magnetic mixing materials are actuated by an externally applied magnetic field. Magnetic mixing of the droplets is described in U.S. Pat. No. 8,617,899 which is incorporated herein by reference in its entirety.

In some embodiments, the droplets may be vibrationally mixed. Vibrational mixing may be achieved using piezoelectric elements coupled to the substrate that are activated to induce ultrasonic waves, surface acoustic waves (SAW) and/or bending waves in the substrate, at least at the sample and/or reference locations. Optical mixing may be achieved, for example, using light induced changes in surface structure of the reaction surface or by light induced changes in the merged droplets or both.

A reaction between constituents of the droplets 480, 482 produces a thermal input signal that includes not only a component indicating enthalpy from the reaction, but also an extrinsic noise component resulting from various sources, such as evaporation, convection, and conduction, described in greater detail in U.S. Pat. No. 7,833,800 which is incorporated herein by reference in its entirety.

The thermal input signal is then conducted vertically through the layered structure that includes the hydrophobic surface layer 475, insulating layer 473, drop merger electrodes 360a, 360b, barrier layer 471, substrate 302, and eventually reaching thermally conductive component 322. The thermally conductive component 322 conducts the thermal signal vertically to the measurement thermochromic material 472. At the same time, a reference reaction can occur on reference drop merger electrodes (not shown in FIG. 4, but shown in FIG. 3B), providing a reference thermal signal that similarly reaches the respective region of reference thermochromic material through the thermally conductive component of the reference location. A change in temperature of the thermochromic material 472 at the sample location causes a spectral shift in the light emanating from thermochromic material 472. The magnitude of the spectral shift of the light emanating from the thermochromic material 472 is related to the change in temperature at the sample location 311-*a*.

Light emanating 499 from the sample thermochromic material 472 may be reflected, scattered, transmitted, and/or fluorescent light. The emanating light 499 can be detected using optical detector 491*a*,*b*. The optical detector may be located at any position relative to a sample or reference location where the light emanating from the thermochromic material of the sample or reference location is detectable. For example, in some embodiments, as shown in FIG. 4, the detector 491*a* may be positioned below the sample location 311-*a* and in some embodiments the detector 491*b* may be positioned above sample location 311-*a*.

In some embodiments, the reflected, scattered, transmitted, and/or fluorescent light 499*a*,*b* emanating from the thermochromic material 472, is relayed onto the optical detector 491*a*, 491*b* by one or more appropriate optical components 490*a*, 490*b* such as lenses, objective lenses, lens combinations, imaging optics, plane-, concave-, convex-mirrors, fibers, gratings, prisms, and other elements. The optical components 490*a*, 490*b* may or may not maintain image information. In some embodiments the light emanating from the thermochromic material may be transmitted to the detector through a waveguide.

In some embodiments, light 499*a*,*b* emanating from the thermochromic material 472 derives from measurement light that is ambient light, e.g., from sunlight, room light, etc., which encounters the thermochromic material 472 and interacts with the thermochromic material 472 to become the emanating light, e.g., scattered, reflected, transmitted, fluorescent light. In some embodiments, at least one light source 496*a*,*b*, which may be positioned at any suitable position relative to the measurement or reference locations. In some implementations, the measurement light source 496*a* may be positioned below the cell 310-2*a* and in some implementations, the measurement light source 496*b* may be positioned above the cell 310-2*a*. FIG. 4 illustrates optional locations for the measurement light source 496*a*,*b*. At either location, the measurement light source 496*a*,*b* emits and/or directs the measurement light 498*a*,*b* toward the sample location of the cell and toward the reference location of the cell (not shown in FIG. 4) such that the measurement light 498*a*,*b* encounters the thermochromic material 472 of the sample and reference locations. In some embodiments, the measurement light may be transmitted to the thermochromic material by a waveguide, e.g., an optical fiber or polymer waveguide.

In some embodiments, measurement light 498*a* is emitted from a light source 496*a* positioned below the cell 310-2*a*. The measurement light 498*a* interacts with the thermochromic material 472 to produce emanating light 499*a*. The light emanating 499*a* from the thermochromic material 472 is detected by a detector 491*a* positioned below the cell 310-2*a*. In this configuration, layers above the thermochromic material 472, e.g., the thermally conductive layer 322, support layer 302, barrier layer 471, electrodes 360*a*,*b*, insulating layer 473 and/or hydrophobic layer 475 need not be transmissive to the measurement light 498*a* or the emanating light 499*a*.

In some embodiments, the measurement light 498*a* is emitted from a light source 496*a* positioned below the cells 310-2*a*. The measurement light 498*a* interacts with the thermochromic material 472 and the thermochromic material emanates light that includes emanating light 499*b*. The light emanating 499*b* from the thermochromic material 472 is detected by a detector 491*b* positioned above the cell 310-2*a*. In this configuration, layers above the thermochromic material 472, e.g., the thermally conductive layer 322, support layer 302, barrier layer 471, electrodes 360*a*,*b*, insulating layer 473 and hydrophobic layer 475 are transmissive to the emanating light 499*b*.

In some embodiments, the measurement light 498*b* is emitted from a light source 496*b* positioned above the cell 310-2*a*. The measurement light 498*b* interacts with the thermochromic material 472 and emanates light, including emanating light 499*a*. The light 499*a* emanating from the thermochromic material 472 is detected by a detector 491*a* positioned below the cell 310-2*a*. In this configuration, layers above the thermochromic material 472, e.g., the thermally conductive layer 322, support layer 302, barrier layer 471, electrodes 360*a*,*b*, insulating layer 473 and hydrophobic layer 475 are transmissive to the measurement light 498*b*.

In some embodiments, the measurement light 498*a* is emitted from a light source 496*a* positioned below the cell 310-2*a*. The measurement light 498*b* interacts with the thermochromic material 472 and emanates light including emanating light 499*a*. The light 499*a* emanating from the thermochromic material 472 is detected by a detector 491*a* positioned below the cell 310-2*a*. In this configuration, layers above the thermochromic material 472, e.g., the thermally conductive layer 322, support layer 302, barrier layer 471, electrodes 360*a*,*b*, insulating layer 473 and hydrophobic layer 475 need not be transmissive to the measurement light 498*a* and to the emanating light 499*a*.

In various embodiments, light reflected from, transmitted through and/or scattered by the thermochromic material is detected by detectors positioned above and/or below the cell. In some embodiments, the thermochromic material absorbs a portion of the measurement light and in response, the thermochromic material emanates fluorescent light. The fluorescent light can be detected by one or more detectors positioned below and/or above the cells.

FIG. 5 illustrates the cross section of the sample location 311-*b* of a cell 310-2*b* in accordance with some embodiments. It will be appreciated that the cell 310-2*b* also includes a reference location (not shown) having similar construction to that of the sample location 311-*b*. The test cell 310-2*b* illustrated in FIG. 5 is similar in many respects to the test cell 310-2*a* of FIG. 4. The cell 310-2*b* of FIG. 5 differs from the cell 310-2*a* of FIG. 4 in that the layer of thermochromic material 572 is disposed between the hydrophobic layer 475 and insulating layer 473.

As previously discussed, a measurement light source 496*a*,*b*, may be positioned at any suitable position relative to the cells, e.g., above and/or below the cell 310-2*b* as shown in FIG. 5. The measurement light source 496*a*,*b* emits and/or directs the measurement light 498*a*,*b* toward the cell 310-2*b* such that the measurement light 498*a*,*b* encounters the thermochromic material 572.

In some embodiments, the measurement light 498*a* is emitted from a light source 496*a* positioned below the cell 310-2*b*. Layers below the thermochromic material 572, e.g. insulating layer 473, electrodes 360*a*,*b*, barrier layer 471, support layer 302 and/or thermally conductive layer 322 at least partially transmit the measurement light 498*a* to the thermochromic material 572. Measurement light 498*a* interacts with the thermochromic material 472 to produce emanating light 499*a*, 499*b*.

In some embodiments, light 499a emanating from the thermochromic material 572 in response to measurement light 498a is detected by a detector 491a positioned below the cell 310-2b. In some embodiments, layers below the thermochromic material 572, e.g., insulating layer 473, electrodes 360a,b, barrier layer 471, support surface 302, and thermally conducting component 322, are transmissive to the emanating light 499a.

In some embodiments, light 499b emanating from thermochromic material 572 in response to measurement light 498a is detected by detector 491b positioned above the cell 310-2b. In these embodiments, layers above the thermochromic material 572, e.g., the hydrophobic layer 475, are transmissive to the emanating light 499b.

In some embodiments, the measurement light 498b is emitted from a light source 496b positioned above the cell 310-2b. Layers above the thermochromic material 572, e.g., hydrophobic layer 475, are transmissive to the measurement light 498b. The measurement light 498b interacts with the thermochromic material 472 to produce emanating light 499a, 499b.

In some embodiments, light 499a emanating from the thermochromic material 572 in response to measurement light 498b is detected by a detector 491a positioned below the cell 310-2b. In this configuration, layers below the thermochromic material 572, e.g., the insulating layer 473, electrodes 360a,b, barrier layer 471, support layer 302, and thermally conducting component 322 are transmissive to the emanating light 499a.

In some embodiments, light 499b emanating from the thermochromic material 572 in response to measurement light 498b is detected by a detector 491b positioned above the cell 310-2b. In this configuration, layers above the thermochromic material 572, e.g., the hydrophobic layer 475, are transmissive to the emanating light 499b.

Figure 6:
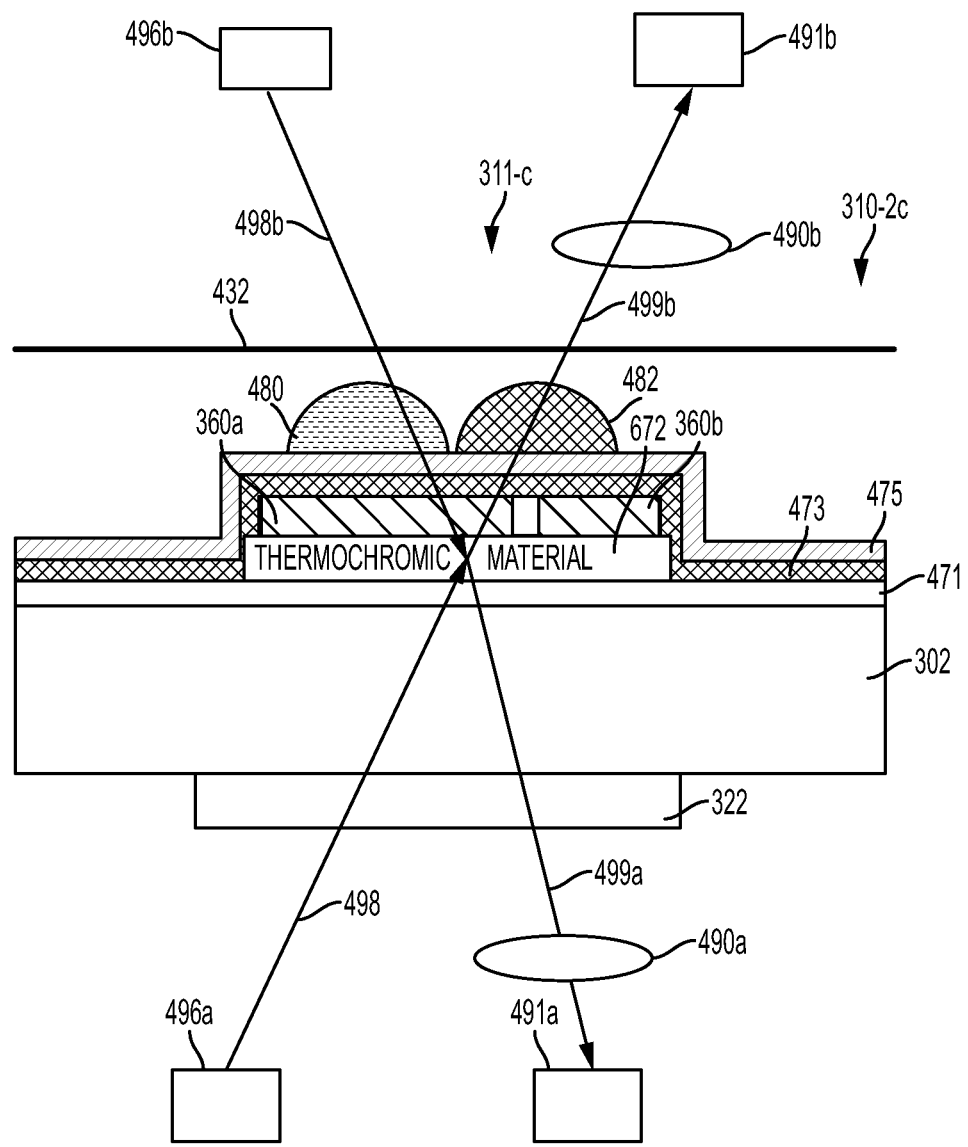

FIG. 6 illustrates another embodiment of the sample location 311-c of a cell 310-2c in accordance with some embodiments. The embodiment illustrated in FIG. 6 is similar in many respects to the embodiment of FIG. 4. The cell 310-2c of FIG. 6 differs from the cell 310-2a of FIG. 4 in that the layer of thermochromic material 672 is disposed between the insulating layer 473 and barrier layer 471.

In some embodiments, the measurement light 498a is emitted from a light source 496a positioned below the cell 310-2c. Layers below the thermochromic material 672, e.g. barrier layer 471, support layer 302, and thermally conductive layer 322 transmit the measurement light 498a to the thermochromic material 672. Measurement light 498a interacts with the thermochromic material 672 to produce emanating light 499a, 499b.

In some embodiments, light 499a emanating from the thermochromic material 672 in response to measurement light 498a is detected by a detector 491a positioned below the cell 310-2c. In these embodiments, layers below the thermochromic material 672, e.g., barrier layer 471, support layer 302, and thermally conducting component 322, are transmissive to the emanating light 499a.

In some embodiments, light 499b emanating from thermochromic material 672 in response to measurement light 498a is detected by detector 491b positioned above the cell 310-2c. In these embodiments, layers above the thermochromic material 672, e.g., the electrodes 360a,b, insulating layer 473, and hydrophobic layer 475, are transmissive to the emanating light 499b.

In some embodiments, the measurement light 498b is emitted from a light source 496b positioned above the cell 310-2c. Layers above the thermochromic material 672, e.g., hydrophobic layer 475, insulating layer 473, and electrodes 360a,b are transmissive to the measurement light 698b. The measurement light 498b interacts with the thermochromic material 672 to produce emanating light 499a, 499b.

In some embodiments, light 499a emanating from the thermochromic material 672 in response to measurement light 498b is detected by a detector 491a positioned below the cell 310-2c. In this configuration, layers below the thermochromic material 672, e.g., barrier layer 471, support layer 302, and thermally conductive component 322 are transmissive to the emanating light 699a.

In some embodiments, light 499b emanating from the thermochromic material 672 in response to measurement light 498b is detected by a detector 491b positioned above the cells 310-2c. In this configuration, layers above the thermochromic material 672, e.g., the electrodes 360a,360b, insulating layer 473, and the hydrophobic layer 475, are transmissive to the emanating light 499b.

Figure 7:
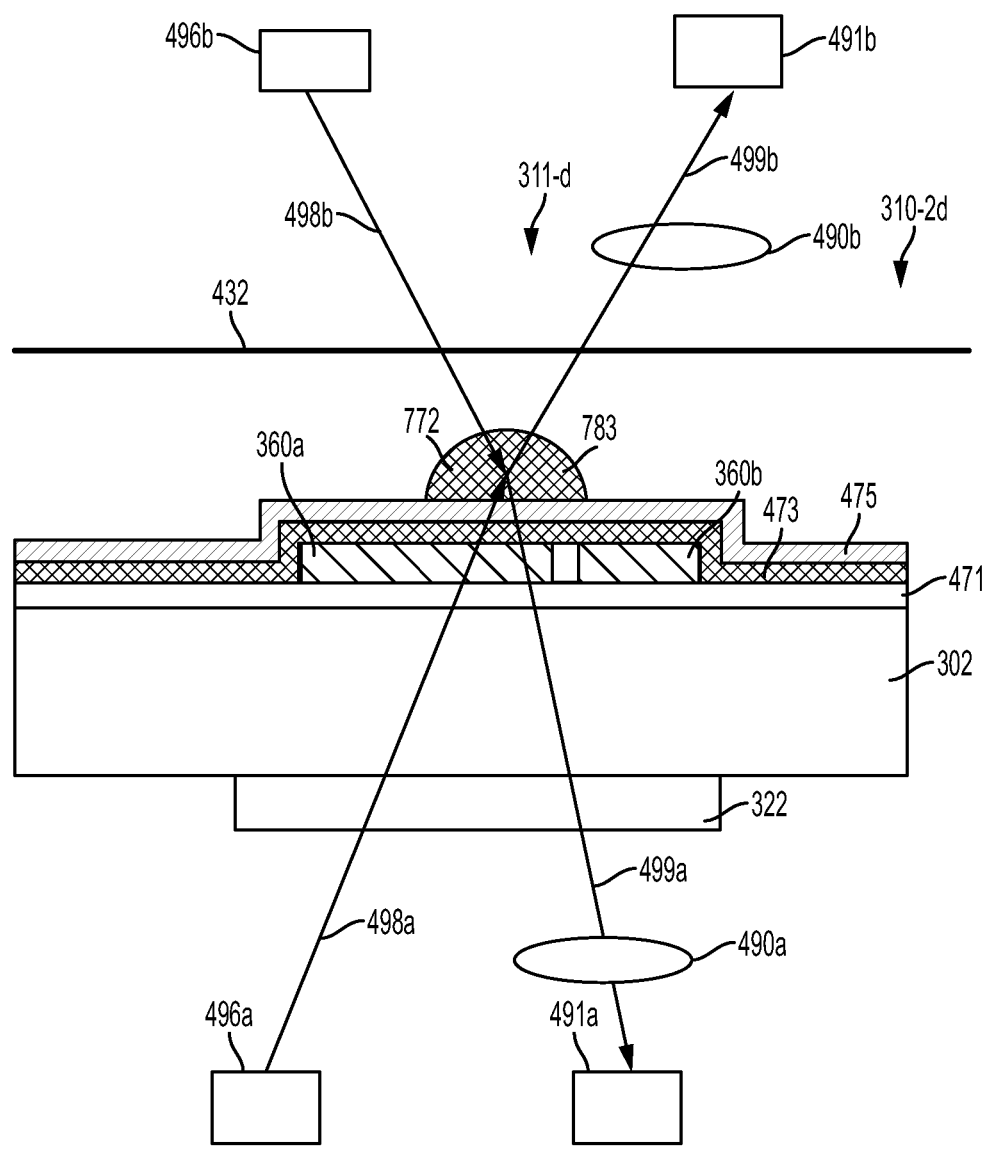

FIG. 7 illustrates another embodiment of the sample location 311-d of a cell 310-2d in accordance with some embodiments. The embodiment illustrated in FIG. 7 is similar in many respects to the embodiment of FIG. 4. The cell 310-2d of FIG. 7 differs from the cell 310-2a of FIG. 4 in that the thermochromic material 772 is disposed within the merged droplet 783. Prior to merging, the thermochromic material 772 may be disposed within the first droplet, the second droplet or both the first and second droplets.

In some embodiments, the measurement light 498a is emitted from a light source 496a positioned below the cell 310-2d. Layers below the thermochromic material 772, e.g. hydrophobic layer 475, insulating layer 473, electrodes 360a, 360b, barrier layer 471, support layer 302, and thermally conductive layer 322 at transmit the measurement light 498a to the thermochromic material 772 disposed in droplet 783. Measurement light 498a interacts with the thermochromic material 772 to produce emanating light 499a, 499b.

In some embodiments, light 499a emanating from the thermochromic material 772 in response to measurement light 498a is detected by a detector 491a positioned below the cell 310-2c. In these embodiments, layers below the thermochromic material 772, e.g., hydrophobic layer 475, insulating layer 473, electrodes 360a, 360b, barrier layer 471, support layer 302, and thermally conducting component 322, are at least partially transmissive to the emanating light 499a.

In some embodiments, light 499b emanating from thermochromic material 772 in response to measurement light 498a is detected by detector 491b positioned above the cell 310-3c.

In some embodiments, the measurement light 498b is emitted from a light source 496b positioned above the cell 310-2c. The measurement light 498b interacts with the thermochromic material 772 to produce emanating light 499a, 499b.

In some embodiments, light 499b emanating from the thermochromic material 672 in response to measurement light 498b is detected by a detector 491b positioned above the cells 310-2c.

In some embodiments, light 499a emanating from the thermochromic material 772 in response to measurement light 498b is detected by a detector 491a positioned below the cell 310-2c. In this configuration, layers below the thermochromic material 672, e.g., hydrophobic layer 475, insulating layer 473, electrodes 360a, 360b, barrier layer 471, support layer 302, and thermally conductive component 322 are transmissive to the emanating light 499a.

Figure 8:
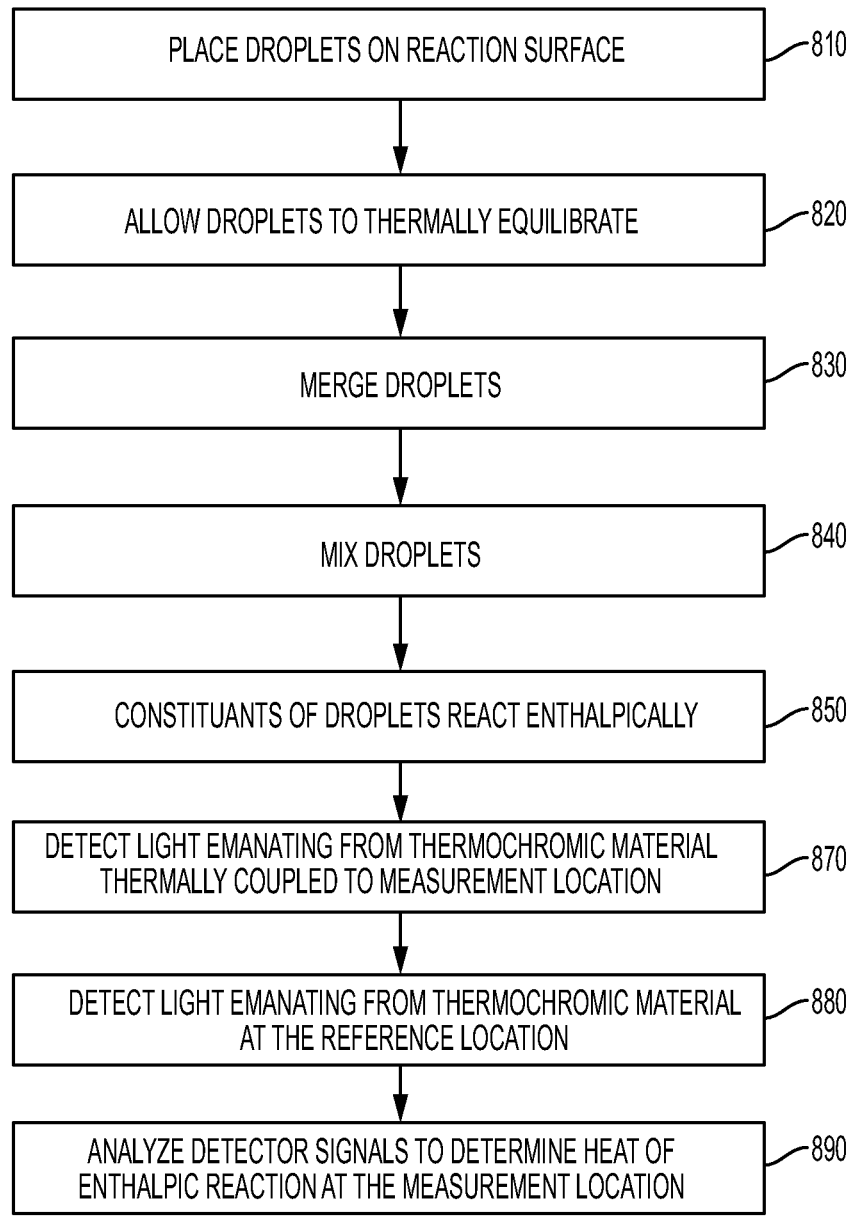
FIG. 8 is a flow diagram illustrating nanocalorimetry based on thermochromic sensing in accordance with some embodiments.

FIG. 8 is a flow diagram illustrating a method of performing nanocalorimetry based on thermochromic sensing. Test and reference droplets are placed 810, respectively, on the reaction surfaces of sample and reference locations of each test cell. The droplets are allowed to thermally equilibrate 820 for a predetermined period of time. After the thermal equilibration period, the droplets are merged 830 on the reaction surface. After merging, the droplets may mix passively or may be actively mixed 840. Constituents within the droplets on the reaction surface of the sample location react 850 enthalpically. A change in temperature caused by the reaction (which may be exothermic or endothermic) is conducted to thermochromic material that is thermally coupled to the merged droplet. The temperature change (increase or decrease in temperature) from the reaction causes a shift in the spectrum of light emanating from the thermochromic material. The emanating light is detected 870 by a sample detector and which generates an electrical signal in response to the emanating light from the sample location. The electrical signal includes information about the spectral shift. Light emanating from the reference location of the test cell may be detected 880 by a reference detector. The reference detector generates a reference electrical signal in response to the light emanating from the reference location of the test cell. The reference electrical signal includes information about common mode temperature effects at the test cell that are not due to the enthalpic reaction (e.g., temperature changes in the environment; temperature changes induced by the droplet merging or mixing; temperature changes induced by the optical read-out). The sample and reference signals may be provided as inputs to an analyzer that is configured to extract information about the spectral shifts of the sample and reference locations. The analyzer determines the change in temperature of the enthalpic reaction of the test droplets based on the information extracted from the sample and reference signals.

Figure 9A:
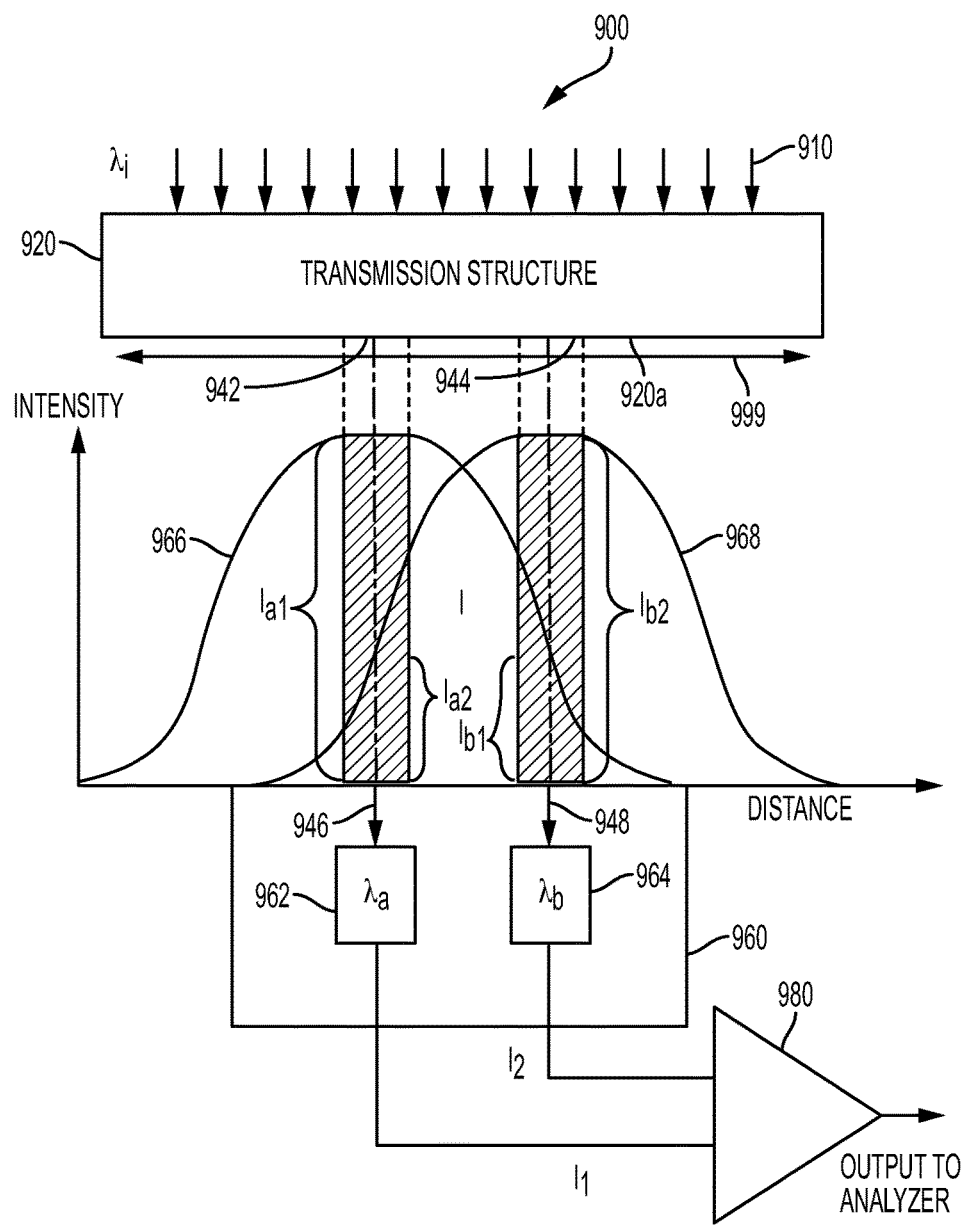
FIGS. 9A and 9B are diagrams that conceptually illustrate wavelength shift detectors in accordance with some embodiments.

FIG. 9A conceptually illustrates a wavelength shift detector 900 that can be used to detect light emanating from thermochromic material of a sample or reference location in accordance to embodiments discussed herein. A wavelength shift detector such as the detector 900 illustrated in FIG. 9A may be associated with each sample location and each reference location. The electrical output signal of the wavelength shift detector 900 includes information about the existence and/or amount of shift in the spectrum of light emanating from the thermochromic material of the location.

Light 910 emanating from the thermochromic material and characterized by a central wavelength $\lambda_i$ is input light to a spectrally varying optical transmission structure 920. The transmission structure 920 has a laterally varying transmission function such that the transmission function varies as a function of position along a lateral axis 999 of its exit surface 920a. The variation in transmission function can, for example, comprise a variation in intensity with wavelength according to a gradient, which can be a constant transmission gradient if it varies continuously and uniformly along the lateral axis 999. The variation in transmission function can be spike-like transmission gradient if the intensity varies with wavelength in a step-like manner along the lateral axis 999. More generally, light is described herein as transmitted with lateral variation when, in response to input light, transmitted light or output light varies with lateral position as a function of wavelength, and the variation with lateral position was not present in the input light. Variation with lateral position is illustrated in FIG. 9A by regions 942 and 944. As shown, region 942 of the transmission structure 920 transmits a sub-band of light in a subrange centered about wavelength $\lambda_a$. Similarly, region 944 transmits a sub-band of light in a subrange centered about wavelength $\lambda_b$. As a result, the light from regions 942 and 944, represented respectively by rays 946 and 948, is incident on the photosensing component 960 at different positions. Light characterized by central wavelength $\lambda a$ is predominantly detected by the portion of the photosensing component 960 at position 962. Light characterized by central wavelength $\lambda_b$ is predominantly detected by the portion of the photosensing component 960 at position 964. Therefore, if the central wavelength characterizing the input light 910 is initially $\lambda_a$, a change in the wavelength of the input light to light having a central wavelength $\lambda_b$ will cause a change in the position of light exiting the transmission structure 920. This change in position will be indicated by a change in the light detected at positions 962 and 964 of the photosensing component 960. More generally, a difference between the intensity of incident light at wavelengths $\lambda_a$ and $\lambda_b$ can be indicated by a difference in light detected at positions 962 and 964. A wavelength shift between wavelengths $\lambda_a$ and $\lambda_b$ or another change in wavelength distribution at the surface 920a of transmission structure 920 can change relative quantities of photons provided at positions 962 and 964 of the photosensing component 920, meaning that the quantities provided at the two positions have a different relation to each other after the change than they did before it. For example, the quantities could increase or decrease, but by amounts such that the quantity at one position becomes a larger or smaller fraction of the quantity at the other position; the quantity at one position could change from being less than the quantity at the other position to being greater; or one quantity could increase while the other decreases, etc.

FIG. 9A shows the relationship between light intensity (transmitted through transmission structure 920) and position across the photosensing component 960 in response to two different incident spectral patterns with light sub-bands having peak energy values. The first pattern, with peak intensity at wavelength $\lambda_a$, results in a light spot on the photosensing component 960 that has an intensity distribution represented by curve 966. The second distribution, with a peak intensity at wavelength $\lambda_b$, similarly results in a light spot with an intensity distribution represented by curve 968. As will be understood, the first light spot, represented by curve 966, may follow a continuous series of positions over time until it reaches the position of the second light spot, represented by curve 968, if a narrow band of input light 910 from the transmission structure 920 makes a continuous transition from $\lambda_a$ to $\lambda_b$.

The graph also shows quantities of photons sensed by positions 962 and 964 in response to the first and second light spots. When the first spot (intensity distribution 966) is provided on photosensing component 960, position 962 of the photosensing component 960 generates a measurement quantity $I_1$ approximately proportional to the quantity of photons sensed by position 962, namely $I_{a1}$, and position 964 generates a measurement quantity $I_2$ approximately proportional to the quantity of photons sensed by position 964, namely $I_{b1}$. $I_1$ and $I_2$ can, for example, be photocurrents generated by a position sensitive photo detector. When the second spot (intensity distribution 968) is on photosensing component 960, position 962 senses a quantity proportional to $I_{a2}$ and position 964 senses a quantity proportional to $I_{b2}$. The relative quantities sensed by positions 962 and 964 change, with the first spot's relative quantity ($I_{a1}/I_{b1}$) being greater than unity and the second spot's relative quantity ($I_{a2}/I_{b2}$) being less than unity. Similarly, the difference ($I_{a1}-I_{b1}$) is a positive quantity whereas the difference ($I_{a2}-$ $I_{b2}$) is a negative quantity. Furthermore, if a similar comparison is made with other adjacent or nearby positions, the peak intensity position of each spot can be approximated by finding the position on the photosensing component having the highest sensed quantity.

In some embodiments, the intensity of adjacent or overlapping spectral regions is integrated and compared to determine a wavelength shift in the distribution. The photosensing component 960 may comprise two detectors and the integration over spectral regions can be performed by measuring the two adjacent regions 962, 964 using the two detectors, for example, photodiodes, split photodiodes, or photomultiplier tubes (PMT). Alternatively also a non-pixelated homogeneous PSD (position sensitive detector) can be used to determine the (spatial) centroid or centroid shift of the light spot transmitted through the transmission structure.

The spectrally varying transmission structure 920 can comprise linear variable filters or spectrally dispersive elements (e.g., prisms, grating, etc.). For flexible measurements, stacked or multi-anode PMTs can be used on a spectrograph. The measurements may be performed at a frequency of at least about 0.01 Hz, up to at least about 1 MHz or even more. The combination of a laterally varying transmission structure 920 and the position-sensitive photosensing component 960 may resolve wavelength shifts significantly smaller than 10 femtometer (fm) or even smaller than 5 fm, e.g., about 3 fm. The individual photodiodes of the photosensing component 960 can generate photo currents $I_1$ and $I_2$ that are amplified with a transimpedance amplifier 980. Signal subtraction and addition may be performed with an analog circuit for superior noise performance prior to sampling by the analyzer. The center of the wavelength distribution can then be computed by $\lambda i \sim (I_1-I_2)/(I_1+I_2)$. In some embodiments, the total size of the wavelength shift detector 900 can closely approach that of the photosensing component 960, which is beneficial for mounting and long-term stability. Additional information involving the measurement of wavelength shifts in input light that can be used in conjunction with the thermochromic temperature sensing approaches disclosed herein is described in commonly owned U.S. Pat. No. 7,701,590 which is incorporated herein by reference.

Figure 9B:
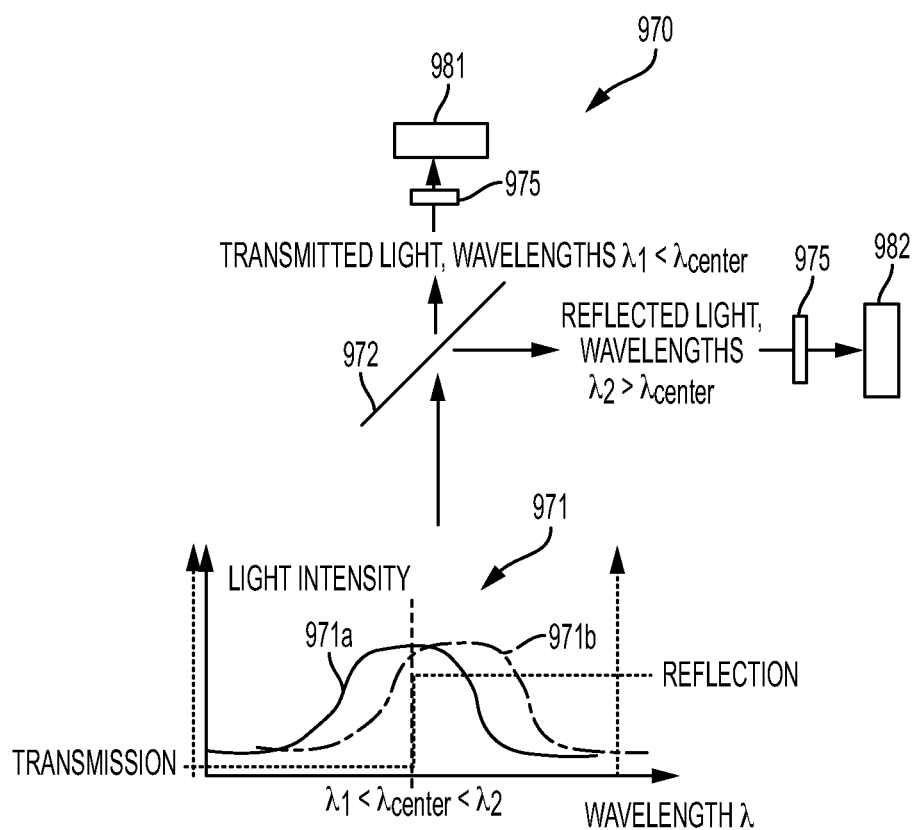

FIG. 9B illustrates another embodiment of a spectral detector 970. All wavelengths of light emanating 971 from the thermochromic material (not shown in FIG. 9B) in response to measurement light are directed through a dichroic mirror 972. The dichroic mirror 972 reflects certain wavelength regions while transmitting other wavelength regions. For example the dichroic mirror 972 could transmit all wavelength $\lambda_1 < \lambda_{center}$ and reflect all wavelength $\lambda_2 >= \lambda_{center}$. Two different detectors, first detector 981 and second detector 982 are disposed to collect the transmitted and reflected light from the dichroic mirror 972. Detector 981 may be used to measure the total light intensity contained in the wavelength region that is smaller than the mirror's center wavelength $\lambda_{center}$ and detector 982 may be used to measure the total light intensity contained in the wavelength region that is larger than the mirror's center wavelength $\lambda_{center}$. For a spectral distribution centered around the center wavelength, both measured light intensities would be identical (curve 971a). For a spectral distribution that is shifted to longer wavelengths (curve 971b), detector 982 would measure higher light intensities than detector 981. Therefore this detector used with the above-described method represents another way of detecting spectral light intensity distributions.

In some embodiments, additional optical elements 975 may be introduced into the light detection path. For example, additional bandpass filters in front of the detectors 981, 982 may be used to limit the detected light to the spectral region that shows the largest shift for a given temperature change. In some embodiments, additional optical elements 975 may include imaging lenses. Imaging may be particularly interesting, when the light detectors are image detectors, such as cameras. The full surface area of the nanocalorimeter device may be illuminated and the measurement light from numerous test cells may be sensed simultaneously in a scheme as presented in FIG. 9B, by imaging the nanocalorimeter device onto at least two cameras. For two simultaneously taken images the color distribution and therefore the temperature of all test cells can be measured by measuring the recorded intensity of the appropriate pixels for each test location on both cameras. Additional markings on the nanocalorimeter device may be used to identify the test cells in the images.

Figure 10:
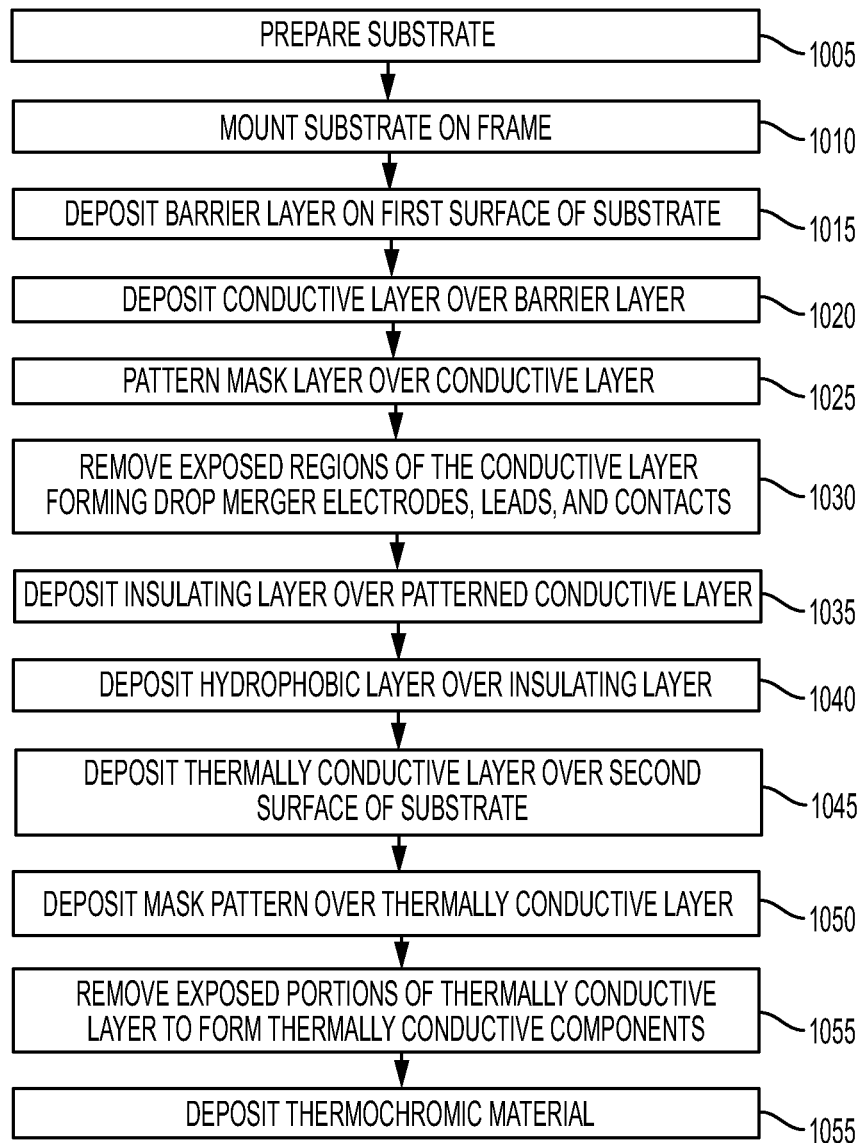
FIG. 10 is a flow diagram illustrating methods of making a nanocalorimeter device in accordance with some embodiments.

FIG. 10 is a flow diagram illustrating a method of making a thermochromic sensing nanocalorimeter device in accordance with various embodiments. Initially, the substrate is prepared 1005 for subsequent operations. In some implementations, the substrate can be a 3 mil (76.2 μm), 2 mil (50.8 μm). 1 mil (25.4 j μm), or ½ mil (12.7 μm) thick Kapton® film or other polyimide film and is generally held flat during processing because flatness is important for subsequent processing steps to achieve sufficiently uniform feature sizes. Prior to deposition of material on substrate, the first surface and the opposing second surface of substrate are cleaned, and substrate is stretched and mounted 1010, e.g., by lamination, on the frame. Mounting substrate on a frame, such as a stainless steel frame, reduces the risk of the substrate curling or cracking during processing.

A barrier layer is deposited 1015 on the first surface of the substrate. In some embodiments, the barrier layer may comprise silicon oxynitride deposited by plasma enhanced chemical vapor deposition (PECVD) to a thickness of 300 nm. Other materials for the barrier layer may also be suitable, including insulating films such as sputtered silicon oxide or PECVD silicon oxide or oxynitride. "Silicon oxide" and "silicon oxynitride" include any possible stoichiometry of silicon with oxygen or silicon with oxygen and nitrogen, respectively; for example, silicon oxides could also be referred to as $SiO_x$, and include SiO, $SiO_2$ and so forth. When properly deposited, the barrier layer provides improved surface smoothness and a humidity and contamination barrier.

A conductive layer that will be patterned to form the drop merger electrodes, leads, and contact pads is deposited 1020 over the barrier layer. For example, the conductive layer may comprise a metal stack such as Cr/Al/Cr and/or TiW/Al/Cr and/or an optically transparent electrode materials such as ITO and/or highly doped ZnO. Mask features are deposited 1025 over the conductive layer to provide an etch mask. The mask features may be deposited by photolithography or in some cases by printing the mask. After forming the mask features, a wet etch can be performed to remove 1030 the regions of the conductive layer that are unprotected by the mask features, producing electrodes of drop merger, leads, and contact pads. An insulating layer, e.g., comprising silicon oxide or silicon oxinitride, is deposited 1035 over the patterned conductive layer. A hydrophobic layer is optionally deposited 1040 over the insulating layer.

A thermally conductive material is deposited 1045 on the second surface of the substrate. For example, in some implementations, the thermally conductive material may be copper that is electroplated on the second surface of the substrate. The conductive material can be patterned, such as by photolithographically forming a mask and performing selective removal. In one implementation, the thermally conductive material may be masked 1050 by printed wax mask features. After masking, the thermally conductive material that is not covered by the wax mask features is removed, forming thermally conductive components on the second surface of the substrate.

In some embodiments, the thermochromic material is deposited 1055 on the thermally conductive components. Alternatively, as discussed in more detail above, the thermochromic material may be deposited elsewhere, e.g., on the barrier layer, the insulating layer, and/or on the hydrophobic layer.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A nanocalorimeter device comprising:
    a substrate having test cells, each test cell comprising a sample location comprising:
        a reaction surface suitable for an enthalpic reaction of constituents of liquid droplets;
        one or more droplet movement features configured to merge the droplets; and
        a layer of thermochromic material thermally coupled to the liquid droplets, wherein light emanating from the thermochromic material exhibits a spectral shift in response to a change in temperature of the liquid droplets.

2. The device of claim 1, wherein each test cell further comprises a reference location comprising a surface suitable to receive reference droplets, the one or more droplet movement features, and the layer of thermochromic material thermally coupled to the reference droplets.

3. The device of claim 1, wherein the substrate is at least partially transparent to the light emanating from the thermochromic material.

4. The device of claim 1, wherein the droplet movement features are at least partially transparent to the light emanating from the thermochromic material.

5. The device of claim 1, wherein the droplet movement features comprise a first electrode and a second electrode spaced apart from the first electrode.

6. The device of claim 1, wherein the droplet movement features comprise an optically controlled surface structure.

7. The device of claim 1, wherein at least one of a surface of, a coating on, and a modified surface layer of the thermochromic material comprises the reaction surface.

8. The device of claim 1, wherein the thermochromic material is disposed between the reaction surface and the droplet movement features.

9. The device of claim 1, further comprising a hydrophobic layer disposed at least at the reaction surfaces of the sample locations.

10. The device of claim 9, wherein the hydrophobic layer is at least partially transparent to the light emanating from the thermochromic material.

11. The device of claim 1, wherein the thermochromic layer is disposed between the droplet movement features and the substrate.

12. The device of claim 1, wherein the thermochromic layer is on an opposite surface of the substrate from the reaction surface.

13. The device of claim 1, wherein the droplet movement features of location are disposed within a thermal equilibration region.

14. The device of claim 13, wherein the thermal equilibration region comprises a thermally conductive component.

15. The device of claim 14, wherein the thermally conductive component is at least partially transparent to the light emanating from the thermochromic layer.

16. The device of claim 14, wherein the thermally conductive component is between the thermochromic layer and the substrate.

17. The device of claim 16, wherein the thermally conductive component is at least partially transparent to the light emanating from the thermochromic layer.

18. The device of claim 1, further comprising a barrier layer disposed over the substrate and the barrier layer is at least partially transparent to the light emanating from the thermochromic layer.

19. The device of claim 1, wherein the thermochromic material comprises one or more of thermochromic liquid crystals, leuco dye, a fluorophore, Prodan bound to DPPC, or a fluorescent protein.

20. The device of claim 1, wherein the light emanating from the thermochromic material is configured to exhibit the spectral shift as a function of temperature in a range of 0.5 nm/K to 1000 nm/K.

21. The device of claim 1, further comprising a magnetic droplet mixing material disposed at each of the locations, the droplet mixing material configured to mix the droplets after merging.

22. The device of claim 1, further comprising a surface structure that can be optically altered to mix the droplets after merging.

23. The device of claim 1, further comprising a cap having at least one cavity that is positioned above and in contact with an upper surface of the device, the cap forming a seal around one or more of the test cells.

* * * * *